United States Patent

Habermann et al.

[11] Patent Number: 5,926,461
[45] Date of Patent: Jul. 20, 1999

[54] PROCESS FOR MEASURING SWITCHING DELAYS

[75] Inventors: Reinhard Habermann, Weiterstadt; Heinrich Doerken, Darmstadt, both of Germany

[73] Assignee: Deutsche Telekom AG, Bonn, Germany

[21] Appl. No.: 08/841,434

[22] Filed: Apr. 22, 1997

[30] Foreign Application Priority Data

Apr. 22, 1996 [DE] Germany ............... 196 15 908

[51] Int. Cl.⁶ .................. H04J 3/14; H04L 12/26
[52] U.S. Cl. ........................... 370/253; 370/396
[58] Field of Search ................... 370/250, 252, 370/253, 508, 395, 241, 242, 244, 396; 371/5.1, 5.3; 379/1, 14

[56] References Cited

U.S. PATENT DOCUMENTS

| | | | |
|---|---|---|---|
| 4,569,042 | 2/1986 | Larson | 370/252 |
| 4,894,823 | 1/1990 | Adelmann et al. | 370/250 |
| 5,428,616 | 6/1995 | Field et al. | 370/253 |
| 5,467,342 | 11/1995 | Logston et al. | 370/253 |

*Primary Examiner*—Alpus H. Hsu
*Assistant Examiner*—Ricky Ngo
*Attorney, Agent, or Firm*—Kenyon & Kenyon

[57] ABSTRACT

In a process for measuring switching delays in telecommunication networks having an asynchronous transfer mode, where cells containing information experience switching delays at switching exchanges, selected cells are provided with a counter, are switched in the same manner as other cells in switching exchanges, and are transmitted via the telecommunication network. The counter contained within the cell in the switching exchanges is increased in each case by a value corresponding to the switching delay, and the counter is read out after the transmission.

7 Claims, 2 Drawing Sheets

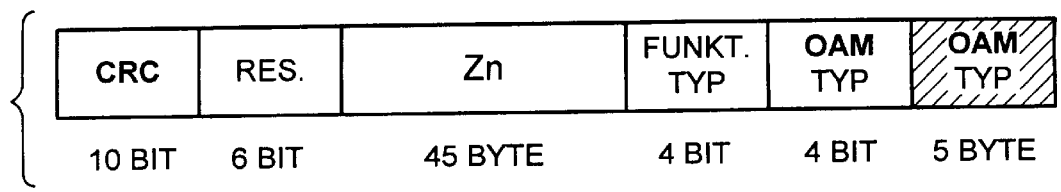
F I G. 1
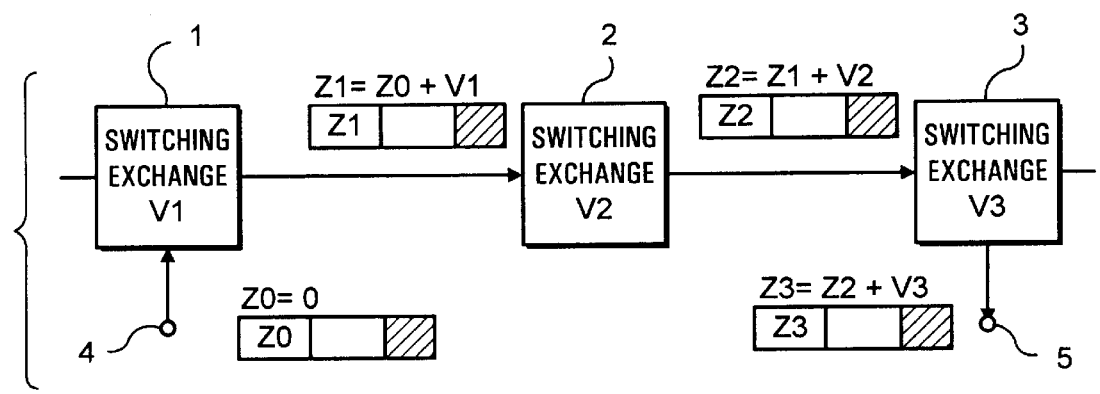
F I G. 2
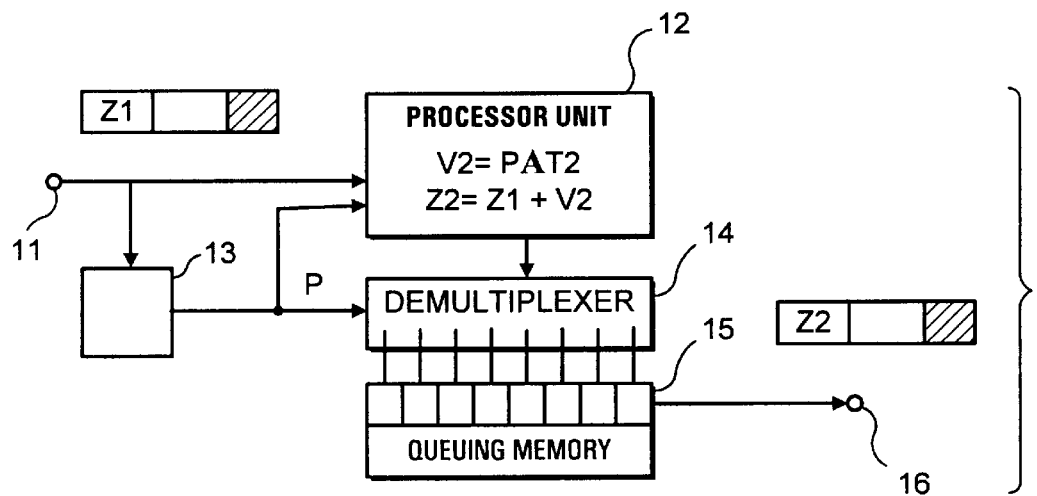
F I G. 3

PROCESS FOR MEASURING SWITCHING DELAYS

FIELD OF THE INVENTION

The present invention relates to a process for measuring switching delays in telecommunication networks having an asynchronous transfer mode, where cells containing bits of information experience switching delays at switching exchanges.

BACKGROUND INFORMATION

Asynchronous transfer mode (ATM) is a flexible and efficient communication method, which is suited, inter alia, for realizing a wide-band ISDN. The information is transmitted in cells which typically have a constant and relatively modest length (53bytes). These cells are comprised of a header of 5 bytes containing, inter alia, address information, and of a part for transmitting information. They are transported and switched in networks having very high data transfer rates of, for example, 155 or 622Mbit/s. In addition to cells containing information, operation and maintenance (OAM) cells are included in the cell stream.

A typical feature of ATM switching is the temporary storing of the cells to be switched in FIFO (First In First Out) queues at the switches. This temporary storing causes variable delays, called switching delays, which occur in addition to the constant delays. The constant delays result from the line length at a given signal propagation rate across the transmitting medium (e.g., glass fiber) and from delays produced by signal processing processes used in transmission and switching technology.

The cell transit time, composed of the sum of all of the constant delays and of the sum of the switching delays occurring in all switching exchanges that are passed through, is an important parameter of service quality. It is, therefore, necessary to monitor switching delays in ATM telecommunication networks.

SUMMARY OF THE INVENTION

A process and a device for measuring the cell transit time in ATM networks has been proposed in German Patent Application 195 27 061. It describes inserting a time stamp in operation and maintenance (OAM) cells at the beginning of their transmission path, and then reading out the time stamp at the end of the transmission path and comparing it to the actual time. It is then possible to measure the entire transit time of the cell through subtraction, without making any distinction between the constant delay components of the transit time and the switching delays.

An object of the present invention (which is based on another German Patent Application) is to specify a simple and reliable process for measuring the switching delay component of the cell transit time, which will make it possible to measure switching delays. The present invention should even make it possible to measure substantial switching delays with a high time resolution.

The present invention achieves this objective in that selected cells are provided with a counter, are switched in the same manner as other cells in switching exchanges, and are transmitted via the telecommunications network, and in that the counter, while in the switching exchanges, is increased by a value corresponding to the switching delay, and that the counter is read out after the transmission.

In the process according to the present invention, the counter can be inserted in the form of a few bytes reserved for that purpose into various cells propagating through the network. However, it is preferably provided for the selected cells to be operation and maintenance (OAM) cells and for the counter to be transmitted within the function-specific field. One further refinement of the process according to the present invention reveals a simple method for updating the counter in the switching exchange being propagated through at any one time in that the value corresponding to the switching delay is derived from the number of memory locations that the selected cell passes through in the switching exchange. In principle, the counter can show the switching delay in any desired units, it being necessary to ensure, however, that the values added in each case are measured in the same units from switching exchange to switching exchange. This is preferably assured by multiplying the number of storage memory locations by a time-pulse period of the switching exchange in question.

Depending on the prevailing requirements, the counter can have a width of 16 or 32 bits. To carry out the process according to the present invention within the switching exchanges, it is preferable that selected cells be provided with an identifier, that cells being received in one switching exchange be queried for the identifier, that the counter be read out at any one time from the cells being received with the identifier, that switching information be extracted from other data of the cells, and, in accordance with this switching information, that a position in a queue and the resulting switching delay be calculated, that the switching delay be added to the counter that has been read out, and for the thus acquired new counter to be written into the cell.

It is especially simple to determine the switching delay in switching exchanges having output memories or central memories, since the position suffices to make the determination. In addition, in switching exchanges having input memories, the principle of operation of the switching algorithm must also be taken into consideration.

In addition, the process according to the present invention can be used to detect the constant delay times in the switching exchanges, these delay times being, as a rule, manufacturer-specific. A delay time defined once by the manufacturer can be stored as a characteristic of the specific switching exchange, preferably in integral multiples of a basic time-delay unit G. This value can then be added to the counter content Z, in addition to the variable delay.

BRIEF DESCRIPTION OF THE DRAWINGS

FIG. 1 the contents of an OAM cell comprising a counter provided for the process according to an exemplary embodiment of the present invention.

FIG. 2 a schematic representation of the summing of a plurality of switching delays.

FIG. 3 a schematic representation for updating the counter within a switching exchange.

DETAILED DESCRIPTION

Figure 4:
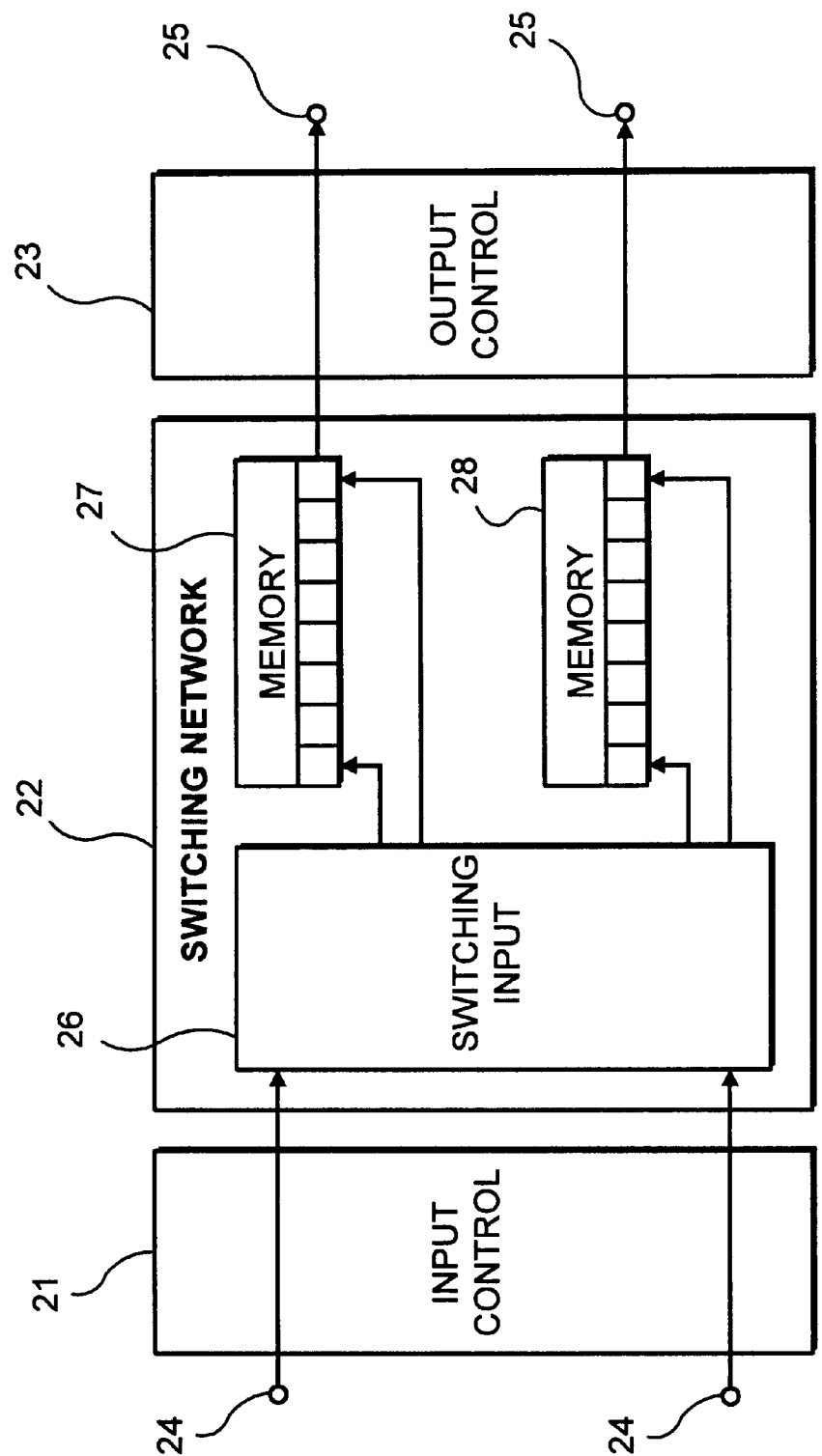
FIG. 4 a greatly simplified block diagram of a switching exchange of an ATM network.

Known OAM cells have an OAM header of 5 bytes and, in each case, four bits for specifying the OAM type and the functional type. 45 bytes are provided for the function itself. Within this field, in the exemplary embodiment, the counter $Z_n$ is provided for the process according to the present invention. Finally, the OAM cell illustrated in FIG. 1 also includes six spare bits and ten check bits (CRC). An OAM cell of this type is referred to in the following as a measuring cell.

FIG. 2 shows a detail of an ATM network having three switching exchanges 1, 2, 3, in which variable delays V1, V2 and V3 occur. At 4, a measuring cell having a counter Z0=0 is supplied to the first switching exchange 1. It arrives via other switching exchanges 2 and 3 at an output 5, a test position (not shown) being connected thereto. After switching exchange 1 has been run through, the counter shows the value Z1=Z0+V1. Correspondingly, after switching exchanges 2 and 3 have been run through, counter Z is increased by V2 and V3. Z3 can then be read out. How frequently measuring cells are to be transmitted depends on the accuracy of a required statistical evaluation. In doing so, the error-free continued supply of useful connections is to be assured.

To increase the counter content by the specific switching delay within a switching exchange, in accordance with FIG. 3, the measuring cell being received at 11 is recognized as such in a processor unit 12. Moreover, on the basis of the address information and the number of cells already contained in the queuing memory, a position P is defined at 13 for writing into a queuing memory 15.

Accordingly, a demultiplexer 14 is controlled. Position P is supplied to the processor unit and multiplied there by the cell clock pulse T2 typical of this switching exchange.

The cell clock pulse is preferably expressed in integral multiples of a basic time-delay unit G. The multiplication yields the switching delay V2 in switching exchange 2, which is then added to counter Z1 that is extracted from the incoming measuring cell. The result Z2 is then inserted again into the measuring cell and, together with this measuring cell, transmitted from output 16 to another switching exchange or to a data terminal.

An additional constant delay time is required when the measuring cells are processed in processor unit 12. To avoid a corruption with respect to the remaining cell stream, all cells are routed through the processor unit. This assures equal treatment with respect to the constant processing time in the processor unit.

At a width of 16 bits, the counter can represent a maximum of 65,535 basic time-delay units. In addition, if a basic delay time of 700 ns is assumed, which corresponds to the approximate cell duration at a 622 Mbit/s data transfer rate, then altogether a 46 ms switching delay can be measured. Because there is a general correlation between clock-pulse rates of switching exchanges and a basic rate to the second power, highly accurate measuring results can be achieved by properly selecting the basic time-delay unit G. In this case, the actual variable propagation delays are exact integral multiples of G. If necessary, multiplication operations are able to be mapped onto simple shift operations. However, should these prerequisites not be given, a completely adequate accuracy can easily be achieved by a correspondingly small value of G. Thus, for example, G=0.1 ns and B=32 bits can be selected. At a time resolution of 0.1 ns, the counter can then represent a switching delay of up to 430 ms.

FIG. 4 represents the block diagram of a switching exchange having an output memory capacity. Of inputs 24, the signals (ATM cells) to be switched are supplied via an input control 21, a switching network 22 and an output control 23 to outputs 25. The switching network is comprised of a switching input 26, whose outputs are linked to a plurality of output memories, of which merely two output memories 27, 28 are shown. Cells, which are provided for the output of output memory 27, are written into the next available position within output memory 27. This position can be used to determine the switching delay, as is described in the context of FIG. 3.

What is claimed is:

1. A method for measuring switching delays in telecommunication networks having an asynchronous transfer mode, wherein cells containing information experience switching delays at switching exchanges, the process method comprising the steps of:

providing at least one cell with a counter;

increasing the counter by a value corresponding to a switching delay of one switching exchange, the value being derived from a number of storage memory locations that the at least one cell passes through in the one switching exchange; and reading out the counter after a transmission of the at least one cell.

2. The method as recited by claim 1 wherein the at least one cell is an operation and maintenance (OAM) cell, and wherein the counter is transmitted within a function-specific field.

3. The method as recited in claim 1 further comprising the step of:

multiplying the number of storage memory locations by a time-pulse period of the one switching exchange through which the at least one cell passes.

4. The method as recited in claim 1 wherein the counter has a width of 16 bits.

5. The method as recited in claim 1 wherein the counter has a width of 32 bits.

6. A method for measuring switching delays in telecommunication networks having an asynchronous transfer mode, wherein cells containing information experience switching delays at switching exchanges, the method comprising the steps of:

providing at least one cell with a counter;

providing the at least one cell with an identifier;

receiving the at least one cell in one switching exchange;

querying the at least one cell for the identifier, when the at least one cell has been received in the one switching exchange;

reading out the counter from the at least one cell at any one time;

extracting switching information data from the at least one cell;

calculating, in accordance with the extracted switching information data, a position for the at least one cell in a queue;

calculating, in accordance with the extracted switching information data, a resulting switching delay of the one switching exchange;

adding the resulting switching delay of the one switching exchange to the counter that has been read out; and writing a new counter into the at least one cell.

7. The method as recited in claim 1 further comprising the step of:

adding to the counter a value which corresponds to a constant delay in the one switching exchange.

* * * * *